Figure 1:
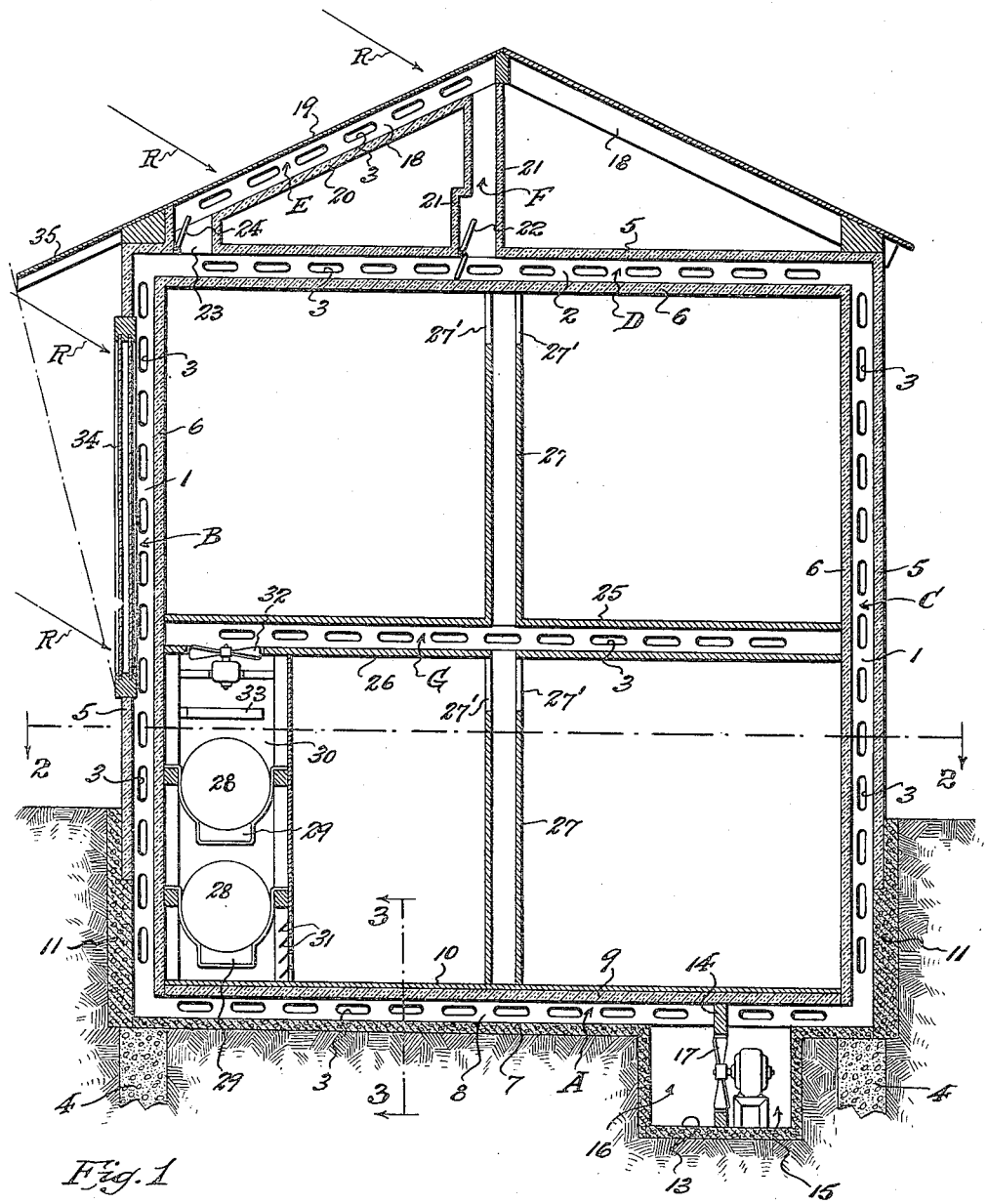

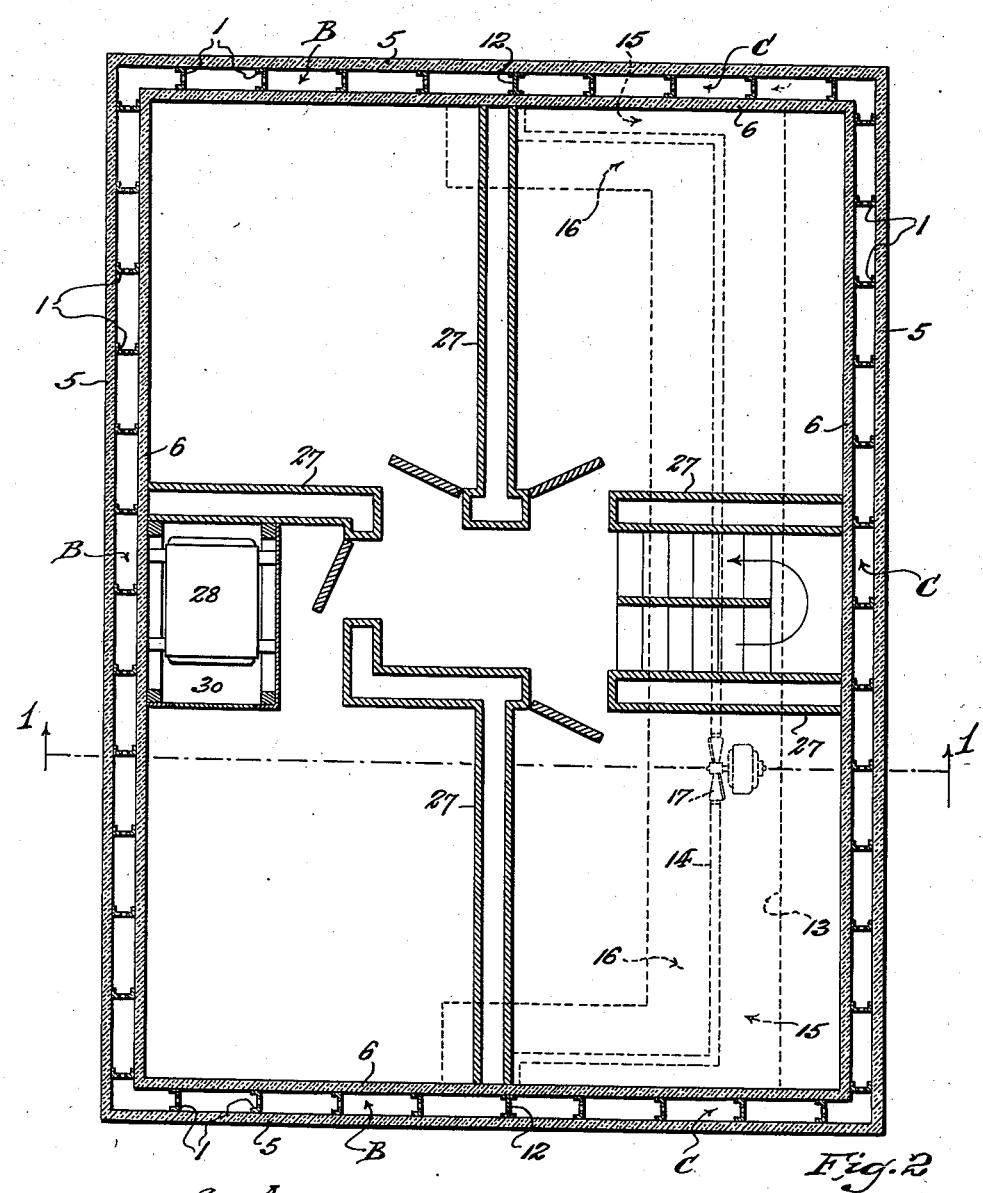

Patented July 10, 1951

2,559,869

UNITED STATES PATENT OFFICE 2,559,869

HOUSE STRUCTURE AND HEATING SYSTEM THEREFOR

Frazer W. Gay, Metuchen, N. J.

Application August 25, 1948, Serial No. 46,105

10 Claims. (Cl. 237—50)

This invention relates to a novel house structure and heating system therefor, including means to conserve generated heat which is employed for interior heating by ground storage of the general type disclosed in my co-pending application Ser. No. 46,104; the instant system including means to supplement the generated heat by heat derived from solar radiation.

The invention has reference, more particularly, to a novel house structure provided with means to greatly increase the availability of solar radiation for interior heating thereof, so as to reduce the total amount of heat energy demand upon any type of heat generator employed as a main source of heat, and especially upon electrically supplied heat produced by the method known to the art as the "Hall" heating method.

In the "Hall" method, electric heaters are provided to heat water stored in tanks. These electric heaters are connected to electric utility company lines, and are assumed to take power therefrom over an approximate period of eight hours comprehended by light load night hours, and, during such period, is assumed to utilize about three times the normal house heat demand; this is not the case, however, since the demand for house heat is much greater than normal during said eight hour night period, and consequently the "Hall" method is found to require an electric power consumption about double that of an ordinary direct electric heating system which only generates and delivers heat when and as required. In theory, under the "Hall" method, the heat storage tanks should be able to store about one-half of the total heat produced per day with a 60° F. temperature change, but, in practice, said tanks are sized to provide about twenty-five per cent greater storage capacity, so that some excess of stored heat is available to carry through a particularly cold day.

Having the above in view, it is an object of this invention to provide a house structure so constructed that its habitable interior is surrounded by spaced inner and outer insulating walls which define an enveloping space through which air may be circulated, said envelope space including portions contiguous to the earth so that heat may be transmitted to and stored in the adjacent earth for return to the circulating air in extremely cold weather; said house structure including an interior heat generating and supplying means, and said house structure further including novel means whereby solar energy may also be transferred to the air circulating in said envelope, and thus transferred to the earth for storage therein as an available auxiliary heat supply supplementary to the generated heat, so that the capacity of the interior heat generator employed, or of an electric heating means and associated storage tanks when utilized, may be substantially reduced, e. g. as much as forty per cent, and the total expenditure of electric energy required for adequate interior heating is, in fact, reduced even more in the fall and especially in the spring of the year, since a substantial part of the required heat, at such times, is supplied by solar energy.

Other objects of this invention, not at this time more particularly enumerated, will be understood from the following detailed description of the same.

An illustrative embodiment of the novel house structure according to this invention is shown in the accompanying drawings, in which:

Fig. 1 is a transverse vertical sectional view of the house structure, taken on line 1—1 in Fig. 2; Fig. 2 is a horizontal sectional view of the same, taken on line 2—2 in Fig. 1; and Fig. 3 is a fragmentary cross sectional view, taken on line 3—3 in Fig. 1, but drawn on a somewhat enlarged scale.

Similar characters of reference are employed in the hereinabove described views, to indicate corresponding parts.

Referring to the drawings, the reference character 1 indicates the wall studs of the building structure, and 2 the beams which support the upper floor ceiling and roof. Said studs and beams are preferably of channel form produced from steel, aluminum or other suitable metallic material. The webs of said studs and beams are punched to provide spaced openings 3 extending along their neutral axes throughout the lengths thereof. The studs 1 are supported on footings 4 which are countersunk in the earth below ground level. Supported by the studs and beams 1 and 2 is an outer wall 5 which completely surrounds the sides and top of the building above ground level. Said outer wall 5 is formed from a material having desirable heat insulating characteristics, such e. g. as vermiculite plaster or similar material. Said vermiculite plaster is applied to metal or other lath (not shown) which is affixed to the outer flanges of the studs 1 and beams 2; such application may be made by hand or gunned into place. An inner wall 6 of like material and construction is mounted on the inner flanges of the studs 1 and beams 2. The walls 5 and 6, as spaced by the studs and beams, define an intermediate air passage envelope which surrounds the building interior.

The side wall structure is extended downwardly below ground level or grade so that the outer side walls 5 extend below frost line; usually for a distance of at least two feet. Within the side wall structure as thus extended the earth is excavated to suitable depth. Contiguous to the subterranean extension of the side walls 5 is arranged a body 11 of concrete or cement of high thermal conductive characteristics, which extends downward to the floor of the excavated interior. Said body 11 is made of suitable thickness, and serves in lieu of a foundation. The concrete or cement body 11 contributes to transfer of heat from the earth to the air circulating within the wall structure envelope.

A concrete base floor 7 of suitable thickness is laid directly upon the earth within the building interior. Laid on this floor 7, to extend between studs 1 at opposite sides of the building structure, are sleepers 8. These sleepers 8 may be of either channel or I-beam form, and are preferably made of steel. Supported by said sleepers 8 is an interior flooring 9, which preferably comprises a two inch layer of vermiculite concrete, over which is laid a surfacing floor 10, which may be of standard concrete, asphalt, tile or other material adapted to furnish suitable wearing surface. The intervening space between the base floor 7 and interior flooring 9 extends between said opposite sides of the building structure so as to provide a bottom air flow course A in communication with the air circulating envelope formed in the side and top wall structures. The webs of said sleepers 8 are punched to provide spaced openings 3 extending along the same, similarly as is done with respect to the studs 1 and beams 2, whereby communication is established between the parallel air flow channels intermediate said studs, beams and sleepers.

That part of the air circulating envelope provided by the side wall structure is subdivided by imperforate studs 12 preferably located within the front and back sections of said side wall structure, whereby to form, in one half of the side wall structure, a rising air flow course B, and, in the opposite half thereof a descending air flow course C; communication between the rising and descending courses being established through the upper horizontal part of the air circulating envelope which is defined by the beams 2, and which provides a transfer air flow course D.

Countersunk in the base floor 7 below one-half of the building to extend between the front and back of the latter as shown, is a duct 13. This duct is subdivided along its length by a partition 14, whereby to provide an air receiving chamber 15, with which the descending air flow course C communicates through one end of the bottom air flow course A, and an air discharging chamber 16, which communicates with the rising air flow course B through the opposite end of said bottom air flow course A. Mounted in the partition 14 is a reversible motor driven air impeller fan 17, which moves the air from the receiving chamber 15 to the discharging chamber 16, or vice versa at will.

In an illustrative embodiment of house structure according to the instant invention, the same is provided with a gabled roof structure supported by rafters 18. The rafters at the south side of the roof structure are provided with a roofing 19 of sheet metal, preferably aluminum; the external surface of which is painted a dark color so as to reduce heat reflection and increase heat transmission therethrough. Affixed to the underside of the rafters 18 of said southern side of the roof structure is an internal wall 20 of insulating material, such e. g. as vermiculite. The space between the roofing 19 and wall 20 provides a roof air flow course E. Insulating walls 21 rising between the top exterior wall 5 and the roofing define an intercommunicating air flow passage F between the transfer air flow course D and the roof air flow course E. Air delivery communication between the transfer air flow course D and the roof air flow course E by way of said air flow course F may be opened and closed by a manipulable damper 22, which when opened to flow of air to the course E, will close off flow of air toward the southern side of the building through that part of the transfer air flow course D beyond said damper. Air discharge communication between the roof air flow course E back to the transfer air flow course D, and thence to the air flow course B, is provided by a discharge port 23, adapted to be opened and closed by a manipulatable control damper 24.

Suitably located within the lower storey of the building is a suitable heat generating means. Hot air is delivered from the heat generating means into passage space G between the floor 25 of the upper storey and the ceiling 26 of the lower storey of the building, being distributed thence through hollow partitions 27 which define the rooms of each storey, for discharge, through registers or other outlets 27', into said rooms.

A preferred heat generating means, as shown, comprises water storage tanks 28 which are heated by suitable electrical heaters 29. Said tanks 28 are suitably mounted within an enclosure or hot box 30. Air is admitted into the bottom of said enclosure or hot box 30, through gravity closed louvres 31 provided in an external wall of the latter. The upper end of the enclosure or hot box 30 communicates with the hot air delivery passage G, and circulation of air through the house interior and enclosure or hot box 30 is preferably effected by means of a motor driven impeller fan 32 mounted within the upper discharge end of said enclosure or hot box 30. If desired, an electrical radiator 33 may be used as an auxiliary to the storage tanks 28, although since radiation area in the form of the tanks 28 costs but little more than that provided by electrical radiators, it follows that, with the tanks, the water storage function thereof costs but little if credit is taken for the radiating surface which the tanks provide.

As an adjunct to the solar energy utilizing means of the house heating system, the outer wall 5 at the southern side of the building is provided with transparent window structure 34 of substantial area, and preferably double glazed, thus permitting a considerable amount of solar rays R—R to pass through the window and impinge upon the inner wall 6, being thus converted to sensible heat within the air circulating envelope. The solar rays therefore not only impinge upon the sheet metal roofing 19 to warm the air in the roof air flow course E, but also are permitted to additionally warm the air circulated through the air flow course B.

The roofing at the southern side of the building is provided with an overhanging extension 35 so that solar rays R—R are cut off from the window structure 34 during the noon period in the summer season when the sun is high overhead. The extent of said overhanging extension 35 is so limited, however, as not to cut off solar rays R—R from said window structure 34 in the winter season when the sun is low in south even during the noon period.

In cold weather, the fan 17 drives air from the discharging chamber 16 through the bottom air flow course A, thence upwardly through the rising air flow course B, across the transfer air flow course D, and downwardly through the descending air flow course C to the receiving chamber 15. If it is extremely cold out doors, the air moving through the bottom air flow course A in contact with the earth supported base floor 7 picks up heat from the contiguous earth mass, since underground temperature is considerably higher than ambient temperature under cold weather conditions. Illustrative of this, extensive tests show that underground temperatures in the neighborhood of metropolitan New York city e. g. average about 50° F., and this temperature changes but little throughout the year for depths in excess of ten feet. The heat transferred to the air from the earth is dissipated as the air is circulated through the envelope by which the building is surrounded.

From the above it will be obvious that the novel building structure provides a thin envelope of recirculating air which surrounds the building interior, a portion of which envelope is contiguous to the earth so as to promote the transfer of heat to and from the air from and to the earth upon relatively slight temperature differential. In warm winter weather (above 30° F.), the heat passes from the recirculating air into the earth, thus increasing the normal flow of heat from the interior of the building across the inner heat insulating wall 6 so that this increment of heat is largely stored in the underlying ground. In cold winter weather (approximating zero), the stored heat passes from the ground into the recirculating air, and thus greatly reduces the drain on the heating generator, so as to economize operation of the latter.

The heating operations in the novel building structure are substantially as follows; to maintain an interior temperature approximating 72° F.

Assuming the normal average outdoor temperature to approximate 30° F. (as e. g. in the metropolitan New York city area), and that the outer wall 5 of the air envelope possesses a heat conductivity approximating 1000 B. t. u. per hour per degree F., and that the inner wall 6 of said air envelope also possesses a heat conductivity approximating 1000 B. t. u. per hour per degree F.; the air within the envelope would normally possess a mid temperature of $$\frac{30 \text{ plus } 72}{2}$$

or 51° F., and the drop across the inner wall 6, from heat supplied by furnace 18, would be 21° F., i. e. the furnace 18 would be required to produce an output of approximately 21×1000 or 21,000 B. t. u. per hour. However, if the normal earth temperature is 50° F., some heat would be stored in the ground, and the furnace 18 would have a somewhat higher output. For outdoor temperatures higher than 30° F. (e. g. a maximum of 60° F.), the envelope air would normally tend to possess an average temperature of approximately $$\frac{60 \text{ plus } 72}{2}$$

or 66° F., and the furnace would only supply 6×1000 or 6000 B. t. u. per hour. However, the earth can be expected to store heat, transferred thereto from the envelope air, and thus to maintain an envelope air temperature of approximately 55° F., so that the furnace need only supply 17×1000 or 17,000 B. t. u. per hour. Under these circumstances, the drop across the outer wall 5 will approximate 5° F. negative, so that 5×1000 or 5000 B. t. u. will be transferred to the earth from outdoors, thus a total heat storage in the ground of 17,000 plus 5000 or 22,000 B. t. u. per hour will be accumulated. The conducting underground wall 11 absorbs over 4000 B. t. u. per degree F.

At zero outdoor temperature, without considering earth storage heat, the envelope air would possess a temperature of 0 plus 72/2 or 36° F., and the furnace 18 would be required to supply 36×1000 or 36,000 B. t. u. If, however, T is assumed to be the temperature of the envelope air, then (72−T) ×1000 equals output of the furnace, and T×1000 equals heat passing through outside wall 5 and T×1000−(72−T) ×1000 is the amount of heat desired from ground storage. If the ground is assumed to yield 4000 B. t. u. per degree F. of variation above 50° F., then (50−T) ×4000 equals available storage heat, and $$T \times 1000 - (72-T) \times 1000 = (50-T) \times 4000$$

and T equals approximately 45⅓° F., so that ground stored heat will supply about 4⅔×4000 or 18,700 B. t. u. per hour, of the 45,300 B. t. u. required, leaving but approximately 26,600 B. t. u. necessary to be supplied by the furnace 18, instead of 36,000 B. t. u. normally needed, thus normally effecting a saving in furnace capacity required of 9,400/36,000 or about 26 per cent.

In the use of the solar heat supplied features of the invention, during cold winter weather (below 30° F.), the dampers 22 and 24 are closed to exclude circulation of air through the roof air flow course E, but in warm sunny winter weather (above 30° F), these dampers 22 and 24 are opened to shunt the envelope circulated air through the roof air flow course E, and under the latter conditions the air impeller fan 17 is reversed, to reverse direction of circulation of air through the air envelope, so that the air flows upward through the air flow course C, thence by way of the transfer air flow course D through the roof air flow course E, and from the latter down the air flow course B to the bottom air flow course A. The air as thus circulated picks up heat derived from solar energy transmitted through roofing 19, and additionally from solar energy transmitted through the window structure 34. The thus additionally warmed air flows into the bottom air flow course A in heat transfer contact with the earth, to which it gives up heat for storage subject to future demand. The solar energy derived heat, by reason of the reversed circulation of air through the recirculating envelope is mainly transferred to the earth underlying the southern part of the house, so that the earth which underlies the southern part of the house is warmer than that which underlies the northern part of the house.

Since the solar energy converted into sensible heat within the air circulating envelope can gain no direct access through to the house interior by reason of the shielding inner wall 6, which preferably is coincident to the entire area of the south side wall of the building, it is preferable that all windows opening into the house interior are reduced to a minimum, and these located in other than the south wall of the building. From this it follows, that, if desired, substantially the entire outer wall at the south side of the building may be made of solar energy transmitting character so that a maximum amount of sensible heat gain derived from solar energy may be rendered available for storage and later use.

The supplementary heat derived from solar energy according to this invention and transferred to the earth underlying the building may be assumed to raise the normal underlying earth temperature approximately 5° F. As above stated, it is assumed that the outer and inner insulating house walls 5 and 6 possess a thermal conductivity of 1000 B. t. u. per hour per degree F., and that the heat conductive wall 7 between the bottom air flow course A and the earth has a conductivity of approximately 5600 B. t. u. per hour per degree F. At zero outdoor temperature, without heat storage or solar energy aid, the house air temperature within the air recirculating envelope would approximate 36° F., and the house heating generator would be required to supply 36,000 B. t. u. per hour. With the solar energy heat supply considered, the air temperature within the air recirculating envelope may be considered as T, and T×1000 B. t. u. per hour would pass through the outer envelope wall 5, and (72−T) ×1000 B. t. u. would pass through the inner envelope wall 6. Under these circumstances, the stored heat from the underlying earth would supply (55−T) ×5600 B. t. u. which equals T×1000−(72−T) ×1000 so that T is of the order of 50° F. Consequently about 50,000 B. t. u. passing through the outer envelope wall 5 and 22,000 B. t. u. passing through the inner wall 6, with 28,000 B. t. u. per hour derived from earth stored heat as a maximum stored heat drain. The saving effected with respect to required generated heat capacity, under my novel system including solar energy aid, will approximate 36,000 B. t. u. (normal) less 22,000 B. t. u. or about 39 per cent.

I am aware that changes could be made in the above described building structure, and that different embodiments of my invention could be made without departing from the scope thereof as defined in the following claims. It is therefore intended that all matter contained in the foregoing description or shown in the accompanying drawings shall be interpreted as illustrative and not in a limiting sense.

I claim:

1. A house structure comprising side and top wall structures formed by spaced outer and inner walls of heat insulating character, the space between said outer and inner walls providing, in part, an air circulating envelope surrounding the house interior, a ground floor structure comprising a base floor of heat conductive character contiguous to the earth and interior flooring of heat insulating material spaced above said base floor so as to complete the air circulating envelope around the house interior, means to normally circulate air in one direction from the ground floor portion of said envelope through the side and top wall portions thereof back to the ground floor portion thereof, whereby the air moving through said ground floor portion of the envelope is in heat transfer contact with the underlying earth, and means to supply solar energy derived heat to the air in said air circulating envelope.

2. A house structure comprising side and top wall structures formed by spaced outer and inner walls of heat insulating character, the space between said outer and inner walls providing, in part, an air circulating envelope surrounding the house interior, a ground floor structure comprising a base floor of heat conductive character contiguous to the earth and interior flooring of heat insulating material spaced above said base floor so as to complete the air circulating envelope around the house interior, means to normally circulate air in one direction from the ground floor portion of said envelope through the side and top wall portions thereof back to the ground floor portion thereof, whereby the air moving through said ground floor portion of the envelope is in heat transfer contact with the underlying earth, and means to supply solar energy derived heat to the air in said air circulating envelope, said latter means comprising a heat conductive roof section exposed to solar rays, an insulating wall spaced beneath said roof section to provide a roof contiguous air flow course, means to connect said roof contiguous air flow course in shunt communication with the air circulating envelope, and manipulatable means to open and close such communication.

3. A house structure comprising side and top wall structures formed by spaced outer and inner walls of heat insulating character, the space between said outer and inner walls providing, in part, an air circulating envelope surrounding the house interior, a ground floor structure comprising a base floor of heat conductive character contiguous to the earth and interior flooring of heat insulating material spaced above said base floor so as to complete the air circulating envelope around the house interior, means to normally circulate air in one direction from the ground floor portion of said envelope through the side and top wall portions thereof back to the ground floor portion thereof, whereby the air moving through said ground floor portion of the envelope is in heat transfer contact with the underlying earth, and means to supply solar energy derived heat to the air in said air circulating envelope, said latter means comprising a heat conductive roof section exposed to solar rays, an insulating wall spaced beneath said roof section to provide a roof contiguous air flow course, means to connect said roof contiguous air flow course in shunt communication with the air circulating envelope, manipulatable means to open and close such communication, and a southerly exposed section of the envelope outer wall having a solar ray admission portion therein comprising a double glazed window structure contiguous to which the envelope passage extends.

4. A house structure comprising side and top wall structures formed by spaced outer and inner walls of heat insulating character, the space between said outer and inner walls providing, in part, an air circulating envelope surrounding the house interior, a ground floor structure comprising a base floor of heat conductive character contiguous to the earth and interior flooring of heat insulating material spaced above said base floor so as to complete the air circulating envelope around the house interior, a heat generating and supplying means within the house interior, means to distribute the supplied heat through the house interior, reversible means to normally circulate air in one direction from the ground floor portion of said envelope through the side and top wall portions thereof back to the ground floor portion thereof, whereby the air moving through said ground floor portion of the envelope is in heat transfer contact with the underlying earth, and means to supply solar energy derived heat to the air in said air circulating envelope when the flow direction of the circulating air within the latter is reversed.

5. A house structure comprising side and top wall structures formed by spaced outer and inner walls of heat insulating character, the space between said outer and inner walls providing, in part, an air circulating envelope surrounding the house interior, a ground floor structure comprising a base floor of heat conductive character contiguous to the earth and interior flooring of heat insulating material spaced above said base floor so as to complete the air circulating envelope around the house interior, a heat generating and supplying means within the house interior, means to distribute the supplied heat through the house interior, reversible means to normally circulate air in one direction from the ground floor portion of said envelope through the side and top wall portions thereof back to the ground floor portion thereof, whereby the air moving through said ground floor portion of the envelope is in heat transfer contact with the underlying earth, means to supply solar energy derived heat to the air in said air circulating envelope when the flow direction of the circulating air within the latter is reversed, said latter means comprising a heat conductive roof section exposed to solar rays, an insulating wall spaced beneath said roof section to provide a roof contiguous air flow course, means to connect said roof contiguous air flow course in shunt communication with the air circulating envelope, and manipulatable means to open and close such communication.

6. A house structure comprising side and top wall structures formed by spaced outer and inner walls of heat insulating character, the space between said outer and inner walls providing, in part, an air circulating envelope surrounding the house interior, a ground floor structure comprising a base floor of heat conductive character contiguous to the earth and interior flooring of heat insulating material spaced above said base floor so as to complete the air circulating envelope around the house interior, a heat generating and supplying means within the house interior, means to distribute the supplied heat through the house interior, reversible means to normally circulate air in one direction from the ground floor portion of said envelope through the side and top wall portions thereof back to the ground floor portion thereof, whereby the air moving through said ground floor portion of the envelope is in heat transfer contact with the underlying earth, means to supply solar energy derived heat to the air in said air circulating envelope when the flow direction of the circulating air within the latter is reversed, said latter means comprising a heat conductive roof section exposed to solar rays, an insulating wall spaced beneath said roof section to provide a roof contiguous air flow course, means to connect said roof contiguous air flow course in shunt communication with the air circulating envelope, manipulatable means to open and close such communication, and a southerly exposed section of the envelope outer wall having a solar ray admission portion therein comprising a double glazed window structure contiguous to which the envelope passage extends.

7. A house structure comprising side and top wall structures formed by spaced outer and inner walls of heat insulating character, the space between said outer and inner walls providing, in part, an air circulating envelope surrounding the house interior, a ground floor structure comprising a base floor of heat conductive character contiguous to the earth and interior flooring of heat insulating material spaced above said base floor so as to complete the air circulating envelope around the house interior, a heat generating and supplying means within the house interior, means to distribute the supplied heat through the house interior, reversible means to normally circulate air in one direction from the ground floor portion of said envelope through the side and top wall portions thereof back to the ground floor portion thereof, whereby the air moving through said ground floor portion of the envelope is in heat transfer contact with the underlying earth, means to supply solar energy derived heat to the air in said air circulating envelope when the flow direction of the circulating air within the latter is reversed, said latter means including a solar ray admission portion in the southerly exposed section of the envelope outer wall comprising a double glazed window structure contiguous to which the envelope passage extends.

8. A house structure comprising external side, top and bottom wall structures having spaced outer and inner walls adapted to provide an air circulating envelope surrounding the entire interior of the house, said walls being of heat insulating character except for those areas of the outer wall contiguous to the earth which are of heat conductive character whereby to promote transfer of heat between the contiguous earth and air circulating in said envelope, a heat generating means within the house interior to supply internal heat to said house interior, reversible air impulsion means to normally induce flow of air within the envelope in one direction, whereby heat from the interior heat generating means is carried to the underlying earth for storage therein, means to supply solar energy derived heat to the air in said envelope when flow direction of the air within the latter is reversed, said latter means comprising a heat conductive roof section exposed to solar rays, an insulating wall spaced beneath said roof section to provide a roof contiguous air flow course, means to connect said roof contiguous air flow course in shunt communication with the air circulating envelope, and manipulatable means to open and close such communication.

9. A house structure comprising external side, top and bottom wall structures having spaced outer and inner walls adapted to provide an air circulating envelope surrounding the entire interior of the house, said walls being of heat insulating character except for those areas of the outer wall contiguous to the earth which are of heat conductive character whereby to promote transfer of heat between the contiguous earth and air circulating in said envelope, a heat generating means within the house interior to supply internal heat to said house interior, reversible air impulsion means to normally induce flow of air within the envelope in one direction, whereby heat from the interior heat generating means is carried to the underlying earth for storage therein, means to supply solar energy derived heat to the air in said envelope when flow direction of the air within the latter is reversed, said latter means comprising a heat conductive roof section exposed to solar rays, an insulating wall spaced beneath said roof section to provide a roof contiguous air flow course, means to connect said roof contiguous air flow course in shunt communication with the air circulating envelope, manipulatable means to open and close such communication, and a southerly exposed section of the envelope outer wall having a solar ray admission portion therein comprising a double glazed window structure contiguous to which the envelope passage extends.

10. A house structure comprising external side, top and bottom wall structures having spaced outer and inner walls adapted to provide an air circulating envelope surrounding the entire interior of the house, said walls being of heat insulating character except for those areas of the outer wall contiguous to the earth which are of heat conductive character whereby to promote transfer of heat between the contiguous earth and air circulating in said envelope, a heat generating means within the house interior to supply internal heat to said house interior, reversible air impulsion means to normally induce flow of air within the envelope in one direction, whereby heat from the interior heat generating means is carried to the underlying earth for storage therein, means to supply solar energy derived heat to the air in said envelope when flow direction of the air within the latter is reversed, said latter means including a solar ray admission portion in the southerly exposed section of the envelope outer wall.

FRAZER W. GAY.

REFERENCES CITED

The following references are of record in the file of this patent:

UNITED STATES PATENTS

| Number | Name | Date |
|---|---|---|
| 213,138 | Shepard | Mar. 11, 1879 |
| 246,626 | Morse | Sept. 6, 1881 |
| 1,086,031 | Davis | Feb. 3, 1914 |
| 1,168,304 | Hellstrom | Jan. 18, 1916 |
| 1,371,949 | Tracy | Mar. 15, 1921 |
| 1,467,005 | Lawrence | Sept. 4, 1923 |
| 2,210,960 | St. Pierre | Aug. 13, 1940 |
| 2,355,495 | Zier | Aug. 8, 1944 |
| 2,364,220 | Johnson | Dec. 5, 1944 |
| 2,465,184 | Alderman | Mar. 22, 1949 |

FOREIGN PATENTS

| Number | Country | Date |
|---|---|---|
| 259,001 | Germany | Apr. 22, 1913 |
| 875,411 | France | Sept. 21, 1942 |
| 875,412 | France | Sept. 21, 1942 |